United States Patent
Brown et al.

(10) Patent No.: US 11,049,295 B2
(45) Date of Patent: Jun. 29, 2021

(54) DETECTION AND/OR CORRECTION OF RESIDUAL IODINE ARTIFACTS IN SPECTRAL COMPUTED TOMOGRAPHY (CT) IMAGING

(71) Applicant: KONINKLIJKE PHILIPS N.V., Eindhoven (NL)

(72) Inventors: Kevin Martin Brown, Chardon, OH (US); Bernhard Johannes Brendel, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 82 days.

(21) Appl. No.: 16/470,995

(22) PCT Filed: Dec. 19, 2017

(86) PCT No.: PCT/EP2017/083567
§ 371 (c)(1),
(2) Date: Jun. 19, 2019

(87) PCT Pub. No.: WO2018/114964
PCT Pub. Date: Jun. 28, 2018

(65) Prior Publication Data
US 2020/0027253 A1    Jan. 23, 2020

Related U.S. Application Data

(60) Provisional application No. 62/435,925, filed on Dec. 19, 2016.

(51) Int. Cl.
*G06T 11/00* (2006.01)
*G06T 5/50* (2006.01)
*G06T 5/00* (2006.01)

(52) U.S. Cl.
CPC ............ *G06T 11/008* (2013.01); *G06T 5/002* (2013.01); *G06T 5/50* (2013.01); *G06T 11/005* (2013.01);
(Continued)

(58) Field of Classification Search
CPC combination set(s) only.
See application file for complete search history.

(56) References Cited

U.S. PATENT DOCUMENTS

2011/0064292 A1* 3/2011 Chen ................... G06T 5/50
382/131
2012/0106816 A1* 5/2012 Bernard De Man ......................
G06T 11/008
382/131
(Continued)

FOREIGN PATENT DOCUMENTS

WO    WO2016142796 A1    9/2016
WO    WO2018083073 A1    5/2018

OTHER PUBLICATIONS

C.M. Phan,"Differentiation of Hemorrhage from Iodinated Contrast in Different Intracranial Compartments Using Dual-Energy Head CT",Jun.-Jul. 2012.AJNR Am J Neuroradiol,www.ajnr.org, pp. 1089-1093.*
(Continued)

*Primary Examiner* — Omar S Ismail
(74) *Attorney, Agent, or Firm* — Larry Liberchuk

(57) ABSTRACT

A system (300) includes input/output configured to receive line integrals from a contrast enhanced spectral scan by an imaging system. The system further includes (300) a processor (326) configured to: decompose (334) the line integrals into at least Compton scatter and a photo-electric effect line integrals; reconstruct the Compton scatter and a photo-electric effect line integrals to generate spectral image data, including at least Compton scatter and photo-electric effect
(Continued)

images; de-noise (332) the Compton scatter and photo-electric effect images; identify (402) residual iodine voxels in the de-noised Compton scatter and the photo-electric effect images corresponding to residual iodine artifact; and produce a virtual non-contrast image using the identified residual iodine voxels.

26 Claims, 10 Drawing Sheets

(52) U.S. Cl.
CPC ............... *G06T 2207/10081* (2013.01); *G06T 2207/20192* (2013.01); *G06T 2207/20216* (2013.01); *G06T 2207/20224* (2013.01); *G06T 2207/30008* (2013.01); *G06T 2211/424* (2013.01)

(56) References Cited

U.S. PATENT DOCUMENTS

| | | | |
|---|---|---|---|
| 2013/0243301 A1* | 9/2013 | Sakaguchi | A61B 6/481 382/132 |
| 2015/0125055 A1* | 5/2015 | Gao | A61B 6/032 382/131 |
| 2016/0163072 A1* | 6/2016 | Koehler | G01N 23/046 382/132 |
| 2016/0321803 A1* | 11/2016 | Lamash | A61B 6/5205 |
| 2017/0186195 A1* | 6/2017 | Lin | A61B 6/5205 |
| 2017/0243380 A1* | 8/2017 | Proksa | A61B 6/482 |

OTHER PUBLICATIONS

Christopher A. Potter, MD,"Dual-Energy CT in Emergency Neuroimaging: Added Value and Novel Applications", Nov.-Dec. 2016,RadioGraphics,radiographics.rsna.org, pp. 2187-2196.*
Okkyun Lee,"Estimation of Basis Line-Integrals in a Spectral Distortion-Modeled Photon Counting Detector Using Low-Rank Approximation-Based X-Ray Transmittance Modeling: K-Edge Imaging Application",Nov. 2017, IEEE Transactions on Medical Imaging, vol. 36, No. 11,pp. 2390-2400.*
A.E. Grams, M. Knoflach,"Residual Thromboembolic Material in Cerebral Arteries after Endovascular Stroke Therapy Can Be Identified by Dual-Energy CT",Aug. 2015, AJNR Am J Neuroradiol,www.ajnr.org, pp. 1413-1416.*
Polad M Shikhaliev,"Computed tomography with energy-resolved detection: a feasibility study", Feb. 19, 2008,Physics in Medicine and Biology,Institute of Physics and Engineering in Medicine,pp. 1475-1488.*
Feng, Mang,"Spectrum optimization in photon counting detector based iodine K-edge CT imaging",Mar. 7, 2019, SPIE Medical Imaging, 2019, San Diego, California,Proc. of SPIE vol. 10948,pp. 1-6.*
PCT International Search Report, International application No. PCT/EP2017/083567, dated Mar. 6, 2018.
Tian S-F. et al. "Virtual Non-Contrast Computed Tomography (CT) with Spectral CT as an Alternative to Conventional Unenhanced CT in the Assessment of Gastric Cancer", Asian Pacific Journal of Cancer Prevention (APJCP), vol. 16, No. 6, pp. 2521-2526, Apr. 3, 2015.
Mendonca P. et al., "A Flexible Method for Multi-Material Decomposition of Dual-Energy CT Images", IEEE Transactions on Medical Imaging, vol. 33, issue 1, pp. 99-116, Jan. 2014.

* cited by examiner

Bone Component

Average Density

The gray values of the pixels are given to illustrate the edge

DETECTION AND/OR CORRECTION OF RESIDUAL IODINE ARTIFACTS IN SPECTRAL COMPUTED TOMOGRAPHY (CT) IMAGING

FIELD OF THE INVENTION

The following generally relates to spectral imaging and more particularly to detection and/or correction of residual iodine artifacts in spectral computed tomography (CT) imaging.

BACKGROUND OF THE INVENTION

A CT scanner generally includes an x-ray tube mounted on a rotatable gantry opposite one or more detectors. The x-ray tube rotates around an examination region located between the x-ray tube and the one or more detectors and emits radiation that traverses the examination region and a subject and/or object disposed in the examination region. The one or more detectors detect radiation that traverses the examination region and generate a signal or projection data indicative of the examination region and the subject and/or object disposed therein.

The projection data is reconstructed to generate volumetric image data, which can be used to generate one or more images. The resulting image(s) includes pixels that are represented in terms of gray scale values corresponding to relative radiodensity. Such information reflects the attenuation characteristics of the scanned subject and/or object, and generally shows structure such as anatomical structures within a patient, physical structures within an inanimate object, and the like. These images are dependent on the X-ray source and properties of the photon detectors.

The detected radiation also includes spectral information since the absorption of the radiation by the subject and/or object is dependent on the energy of the photons traversing there through. Such spectral information provides additional information such as information indicative of elemental or material composition of tissue and/or a material of the subject and/or object. However, with conventional CT, the projection data does not reflect the spectral characteristics as the data it represents is proportional to the energy fluence integrated over the energy spectrum.

A CT scanner configured for spectral (multi-energy) imaging leverages the spectral characteristics. One application of spectral CT imaging is the ability to make Virtual Non-Contrast (VNC) images by separating iodine from calcium, and removing the iodine component from the standard mono-chromatic images at a given keV. A goal is to produce an image that is equivalent to an image produced from a scan without contrast agent (a "true non-contrast" or TNC image). The VNC image eliminates a need for a second or true non-contrast scan, thus reducing the overall X-ray dose to the patient in an examination.

However, VNC images display isolated residual iodine artifacts, particularly in the region of small vessels in the liver, when generated with spectral components decomposed from de-noised spectral image data. These iodine residuals are not expected in the VNC images, which should free of all iodine. Unfortunately, these artifacts reduce the confidence of the clinician regarding the accuracy of the VNC images in other areas. An example is shown in FIGS. 1 and 2. FIG. 1 shows a TNC image. FIG. 2 shows a VNC image with residual iodine artifacts, which manifest as shadows 200 in some of the contrast filled liver vessels. In the TNC image of FIG. 1, these shadows are absent.

Residual iodine in the VNC images can be traced to artifacts in photo-electric effect/Compton scatter basis decomposition pair. Essentially, the value of the Compton scatter image in these regions is too large, and thus is identified as containing some calcium, and is not removed during generation of the VNC image. Due to the nature of the anti-correlated noise in a photo-electric effect/Compton scatter material decomposition, anything removed from one image in a joint photo-electric effect/Compton scatter denoising algorithm tends to show up in the other image. The residuals in the Compton scatter image can be attributed to limitations of the joint anti-correlated denoising.

In view of the foregoing, there is an unresolved need for another approach to produce a VNC image, e.g., one without or with reduce residual iodine artifact.

SUMMARY OF THE INVENTION

Aspects described herein address the above-referenced problems and others.

In one aspect, a system includes input/output configured to receive line integrals from a contrast enhanced spectral scan by an imaging system. The system further includes a processor configured to: decompose the line integrals into at least Compton scatter and a photo-electric effect line integrals; reconstruct the Compton scatter and a photo-electric effect line integrals to generate spectral image data, including at least Compton scatter and photo-electric effect images; de-noise the Compton scatter and photo-electric effect images; identify residual iodine voxels in the de-noised Compton scatter and the photo-electric effect images corresponding to residual iodine artifact; and produce a virtual non-contrast image using the identified residual iodine voxels.

In another aspect, a system includes a processor configured to receive a signal indicating residual iodine identified in a Compton scatter image and a photo-electric effect image reconstructed from decomposed line integrals of a contrast enhanced spectral scan by an imaging system and de-noised, correct the Compton scatter image and the photo-electric effect image based on the identified residual iodine voxels, and produce a virtual non-contrast image with the corrected Compton scatter and photo-electric effect images.

In another aspect, a system includes a reconstructor configured to reconstruct spectral image data during a first reconstruction pass using an iterative reconstruction with regularization and generate a Compton scatter image and a photo-electric effect image, wherein the spectral image data is decomposed from line integrals generated from a contrast enhanced spectral scan by an imaging system. The system further includes a processor configured to receive a signal indicating residual iodine identified in the Compton scatter image and the photo-electric effect image. The reconstructor performs a second pass reconstruction using the identified residual iodine to control the regularization of the iterative reconstruction.

In another aspect, a method includes receiving line integrals from a contrast enhanced spectral scan, decomposing the line integrals into at least Compton scatter and photo-electric effect line integrals, de-noising the decomposed spectral image data, reconstructing the de-noised decomposed spectral image data to generate a Compton scatter image and a photo-electric effect image, identifying residual iodine voxels in the Compton scatter image and the photo-electric effect image corresponding to residual iodine artifact, and producing a corrected virtual non-contrast image using the identified residual iodine voxels.

Those skilled in the art will recognize still other aspects of the present application upon reading and understanding the attached description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
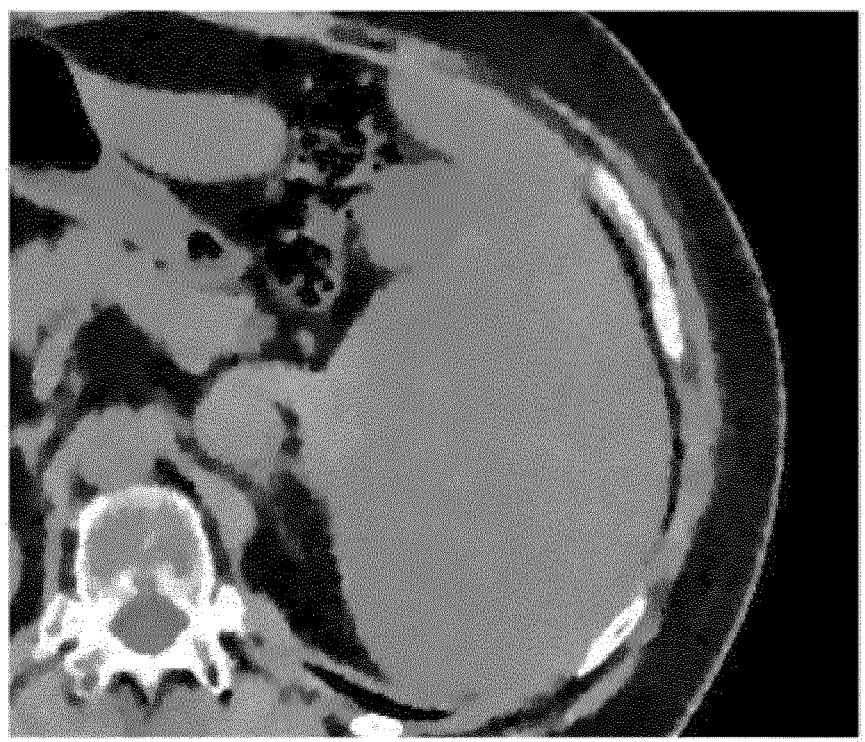
FIG. 1 shows a true non-contrast image with no visible residual iodine artifacts in liver vessels.
Figure 2:
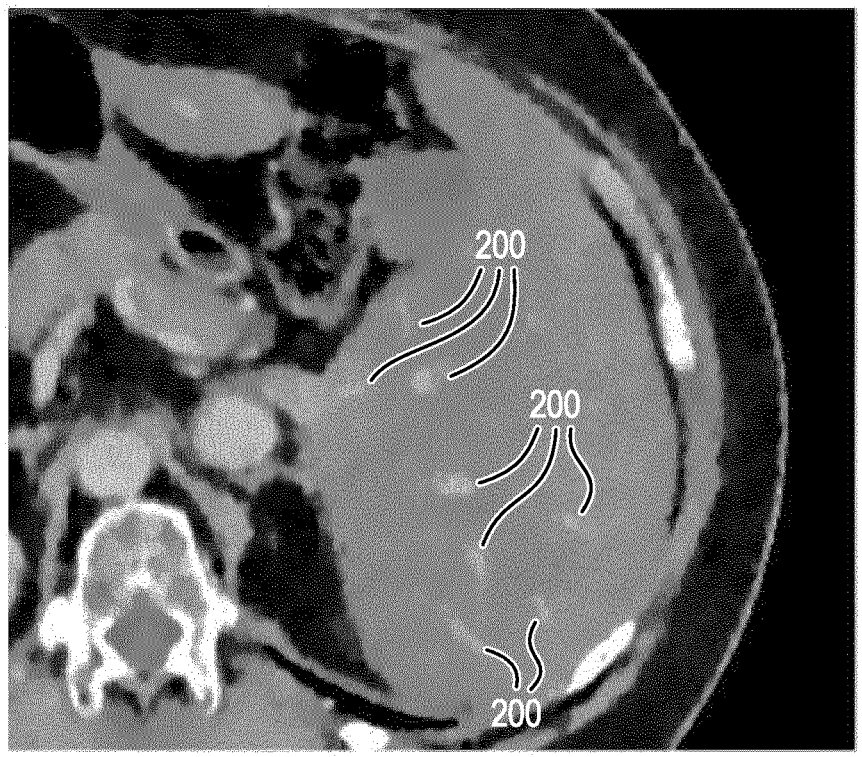
FIG. 2 shows a virtual non-contrast image with residual iodine artifacts, which manifest as shadows in some of the contrast filled liver vessels.
Figure 3:
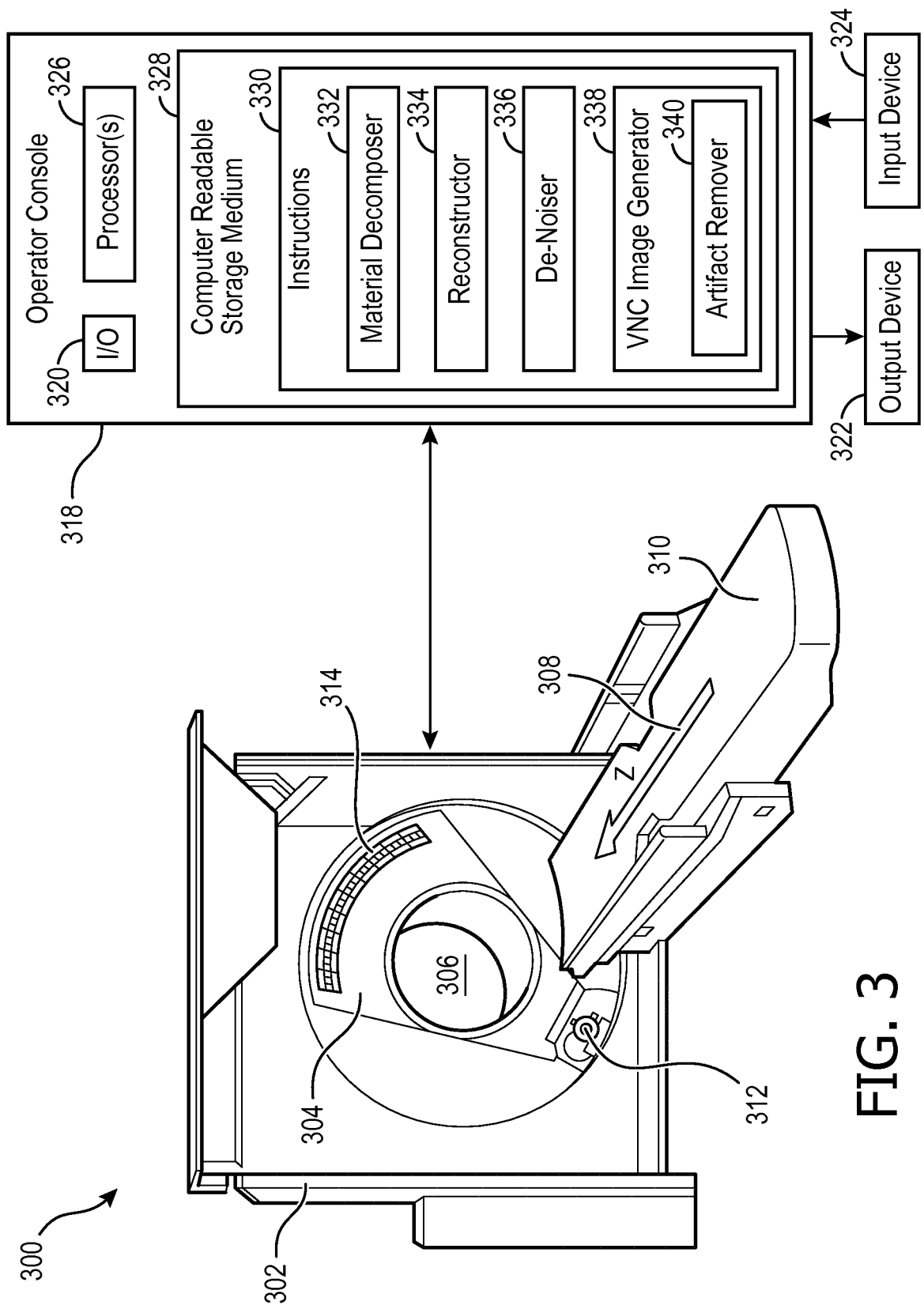
FIG. 3 schematically illustrates an example imaging system including a VNC image generator with an artifact remover.

FIG. 3 schematically illustrates an imaging system 300 such as a computed tomography (CT) scanner configured for spectral (multi-energy) imaging.

The imaging system 300 includes a stationary gantry 302 and a rotating gantry 304. The rotating gantry 304 is rotatably supported by the stationary gantry 302 and rotates around an examination region 306 about a longitudinal or z-axis 308. A subject support 310, such as a couch, supports an object or subject in the examination region. The subject support 310 is movable in coordination with performing an imaging procedure so as to guide the subject or object with respect to the examination region 306. The following is described in the context of a contrast-agent (e.g., iodine) scan of an object or a subject administered the contrast agent.

A radiation source 312, such as an x-ray tube, is rotatably supported by the rotating gantry 304. The radiation source 312 rotates with the rotating gantry 304 and emits polychromatic radiation that traverses the examination region 306. The radiation source 312 can be a single x-ray tube configured to emit radiation for a single selected peak emission voltage (kVp) (i.e. the energy spectrum at that kVp), configured to switch between at least two different peak emission voltages (e.g., 80 kVp, 340 kVp, etc.) during scanning, and/or include two or more x-ray tubes angular offset on the rotating gantry 304 with each configured to emit radiation with a different mean energy spectrum.

A radiation sensitive detector array 314 subtends an angular arc opposite the radiation source 312 across the examination region 306. The detector array 314 includes one or more rows of detectors that arranged with respect to each other along the z-axis 308 direction and detects radiation traversing the examination region 306. The detector array 314 includes an energy-resolving detector such as a multi-layer scintillator/photo-sensor detector and/or direct conversion detectors and/or non-energy-resolving detectors. The detector array 314 generates and outputs a signal (projection data, or line integrals) indicative of N different energies, where N is an integer equal or greater than two.

An operator console 318 allows an operator to control an operation of the system 300. This includes selecting acquisition protocol (e.g., multi-energy), a reconstruction algorithm (e.g., VNC), etc. The operator console 318 includes input/output (I/O) 320 that facilitates communication with at least an output device(s) 322 such as a display monitor, a filmer, etc., and an input device(s) 324 such as a mouse, keyboard, etc. The operator console 320 further includes at least one processor 326 (e.g., a central processing unit (CPU), a microprocessor, etc.) and a computer readable storage medium 328 (which excludes transitory medium), such as physical memory and/or other non-transitory medium. The computer readable storage medium 328 stores computer readable instructions 330, and the processor 326 is configured to execute the instructions 330.

The illustrated computer readable instructions 330 include a material decomposer 332 configured to decomposes the line integrals based on known and/or other decomposition algorithms according to different material bases as each material has a unique attenuation spectral response, i.e., each material has a unique material response on an image-based energy map. In one instance, the material decomposer 332 decomposes the line integrals to at least produce a Compton scatter and a photo-electric line integrals. A non-limiting example of a material decomposition is in application serial number PCT/IB2015/059602, publication number WO2016097981 A1, filed Dec. 14, 2015, and entitled "Penalized maximum likelihood material decomposition," the entirety of which is incorporated herein by reference.

The illustrated computer readable instructions 330 further includes a reconstructor 334 configured to reconstruct the decomposed line integrals projection data and generates volumetric image data indicative of the examination region 306 and the portion of the object or subject therein. In one instance, the reconstructor 334 employs a spectral reconstruction algorithms and generates at least a Compton scatter image and a photo-electric image. Additionally or alternatively, the reconstructor 334 combines the lines integrals and employs a non-spectral reconstruction algorithm to generate non-spectral (conventional) volumetric image data. Additionally or alternatively, the reconstructor 334 combines the Compton scatter and the photo-electric images to generate a conventional image.

The illustrated computer readable instructions 330 further include a de-noiser 336. The de-noiser 336 is configured to de-noise the spectral images. For example, in one non-limiting instance, the de-noiser 336 is configured to determine a noise pattern (e.g., for an estimate of a local noise value of each voxel of a spectral image) for each spectral image and reduce noise of the spectral images based on the noise pattern. A non-limiting example of such an approach is described in application serial number U.S. Ser. No. 14/232,292, publication number US 2014/0133729 A1, filed Jul. 30, 2012, and entitled "Image processing for spectral ct," the entirety of which is incorporated herein by reference. Another suitable example is described in application serial number PCT/IB2015/059396, publication number WO/2016/103088, filed Dec. 7, 2015, and entitled "Anti-Correlated Noise Filter," the entirety of which is incorporated herein by reference. Other de-noising approaches are also contemplated herein.

Additionally or alternatively, the de-noising can be applied during reconstruction as disclosed in application serial number EP 16196707.0, filed Nov. 1, 2016, Ser. No. 16/196,707.0, and entitled "Apparatus for noise reduction in body part imagery," which is incorporated herein by reference in its entirety. Additionally or alternatively, the de-noising can be applied during material decomposition as disclosed in application serial number PCT/IB2015/059602, publication number WO2016097981 A1, filed Dec. 14, 2015, and entitled "Penalized maximum likelihood material decomposition," which is incorporated herein by reference in its entirety. Other reconstruction and/or decomposition de-noising approaches are also contemplated herein.

The illustrated computer readable instructions 330 further include a VNC image generator 338. The VNC image generator 338 is configured to generate VNC images from the de-noised spectral images. As described in greater detail below, the VNC image generator 338 includes an artifact remover 340 that jointly analyzes the de-noised photo-electric effect and Compton scatter images and detects and/or identifies regions of the images which are likely to contain residual iodine artifacts. Then, in one instance, the an artifact remover 340 corrects the values of the photo-electric effect and Compton scatter images for voxels which are identified as containing residual iodine. Generally, this includes subtracting a predetermined quantity from the Compton scatter image and adding a same quantity to the photo-electric effect image. This approach is referred to herein as Residual Iodine Subtraction (RIS). The VNC image generator 338 then generates the VNC image based on the corrected Compton scatter and photo-electric effect images. Also described in greater detail below, in another instance the identified regions are used to control regularization in an iterative reconstruction with regularization to reduce and/or remove such artifact.

Figure 4:
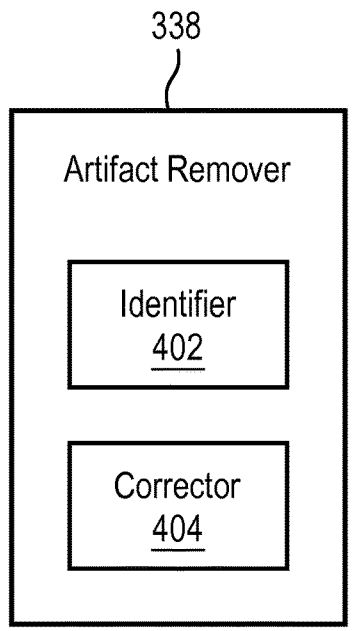
FIG. 4 schematically illustrates an example of the artifact remover.

FIG. 4 schematically illustrates an example of the artifact remover 340. In this example, the artifact remover 340 includes a residual iodine detection component ("IDENTIFIER") 402 and a residual iodine subtraction component ("CORRECTOR") 404.

Figure 5:
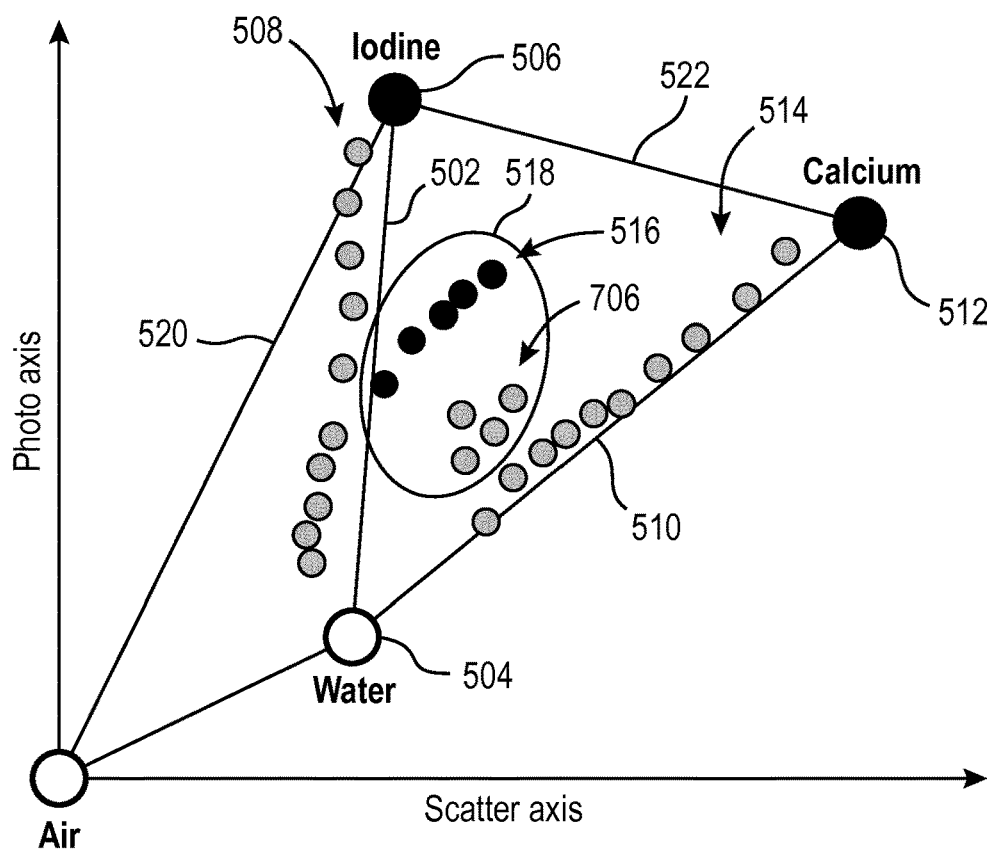
FIG. 5 shows areas where voxels of various composition fall on a Compton scatter-photo-electric effect plane.

Values of image voxels in the decomposed photo-electric effect and Compton scatter images can be visualized on a scatter plot with the Compton scatter values on the x-axis and photo-electric effect values on the y-axis for each voxel. FIG. 5 shows an example. In general, voxels containing iodine lie along a water-iodine line 502 between water 504 and iodine 506 with increasing iodine concentration. Voxels 508 represent such voxels. In contrast, voxels containing calcium iodine lie along a water-calcium line 510 between water 504 and calcium (bone) 512 with increasing concentration. Voxels 514 represent such voxels.

Voxels of residual iodine artifact 516 tend to lie in a region 518 between the lines 502 and 510. These voxels tend to have slightly too much Compton scatter component, and not enough photo-electric effect component. As such, they fall just to the right of the expected iodine region 502. A way to quantify this is to assign a "probability" of a voxel belonging to iodine or calcium/bone. Points on the water-iodine line 502 will have zero bone probability (p=0), points on the water-calcium line 510 will have high bone probability (e.g., p=1), and the probability for points in between the water-iodine and the water-calcium line 502 and 510 will vary depending on how close they are to the water-iodine and the water-calcium line 502 and 510.

A way to assign bone probabilities to voxels is by applying the multi-material decomposition algorithm described in Mendonca et al., "A Flexible Method for Multi-Material Decomposition of Dual-Energy CT Images," IEEE Transactions on Medical Imaging, 33(1), 99-116, 2014, to the Compton scatter and photo-electric effect images, although other approaches are contemplated herein. This algorithm decomposes each point in the photo-electric effect/Compton scatter plane into a sum of three vectors, depending on the triangle in which the point lies. Points inside the air-water-iodine triangle 520 are expressed as sums of the vectors pointing to the air, water, and iodine points, while points inside the water, iodine, calcium triangle 522 are expressed as linear combinations of water, iodine, and calcium.

Figure 6:
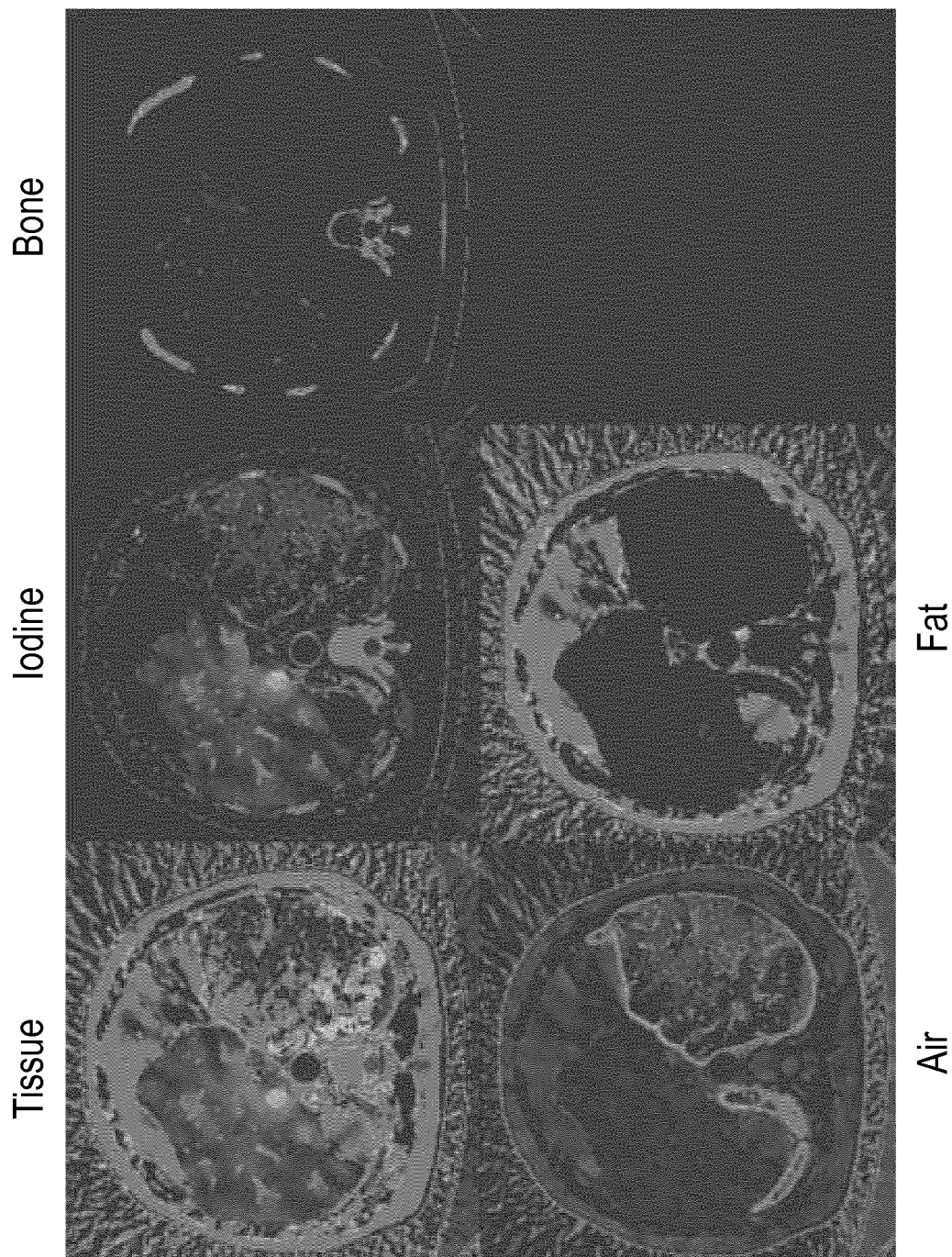
FIG. 6 shows an example of material images from a multi-material decomposition.

Thus, the Compton scatter and photo-electric effect values of each voxel can be written as a linear combination of a given number of components (e.g., five (5) in this example, only three (3) of which are non-zero for any given voxel) as follows:

$$\mu_{orig} = \alpha_{tissue} \cdot \mu_{tissue} + \alpha_{iodine} \cdot \mu_{iodine} + \alpha_{bone} \cdot \mu_{bone} + \alpha_{air} \cdot \mu_{air} + \alpha_{fat} \cdot \mu_{fat},$$

where $\mu$ has a Compton scatter and photo-electric effect component: $\mu_{bone} = [\mu_{scatter}, \mu_{photo}]$, for example. An example of a result of a multi-material decomposition is shown in FIG. 6 for the following five (5) material components: tissue, iodine, bone, air and fat, where coefficient values a for the different material components are shown in the images of FIG. 6.

Figure 7:
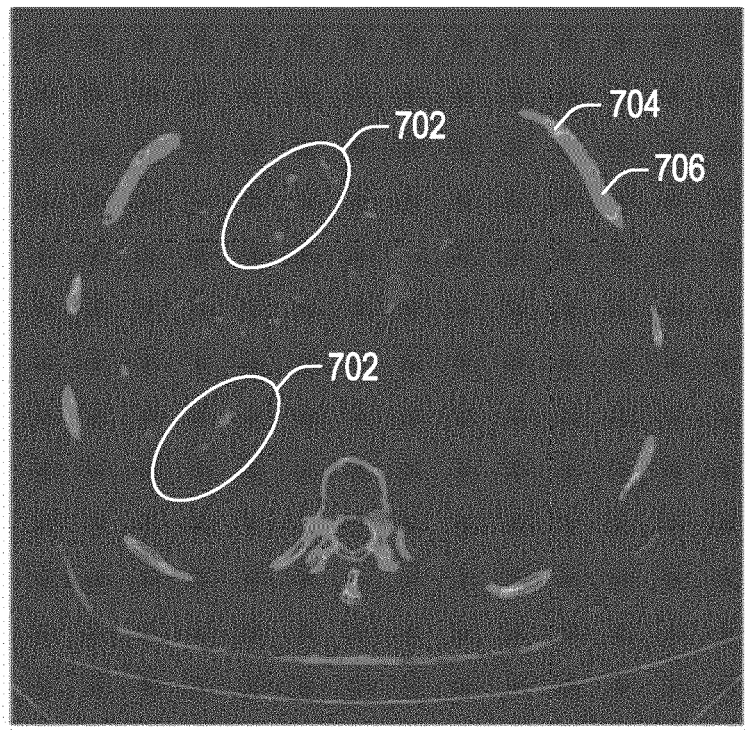
FIG. 7 shows the bone component image of the multi-material decomposition with iodine regions.

The bone component values can be seen as representing "probabilities" of a voxel containing bone. The bone component image is mostly sparse with some lower density values in a region of the residual iodine, e.g., the regions 702 in FIG. 7, and both higher and lower density values respectively in bone regions 704 and 706. A thresholding operation on the bone component values 704 and 706, however, would not find only the residual iodine voxels 702 but would also find bone voxels 706 because some regions near the edges of bone (e.g., in the spine and ribs) also have lower bone coefficients. The voxels 706 are also represented in FIG. 5 as being closer to the water-calcium line 510. The processor 326 applies additional processing to distinguish residual iodine from the bone voxels.

Any residual iodine voxel should not be connected to many voxels with a large bone component, while true bone voxels with lower bone coefficients should always be near voxels with large bone components. The processor 326 further separates residual iodine from bone by finding groups of connected voxels with bone coefficients >0 (where 0=background). These are known as "connected components" herein and generally in the image processing field. Then, for each connected component, the processor 326 computes an average density of its bone values from the multi-material decomposition:

$$\rho_i = \frac{\sum_j \alpha_j}{\# \text{ voxels in group } i} \text{ for all voxels } j \text{ belonging to group } i.$$

Figure 8:
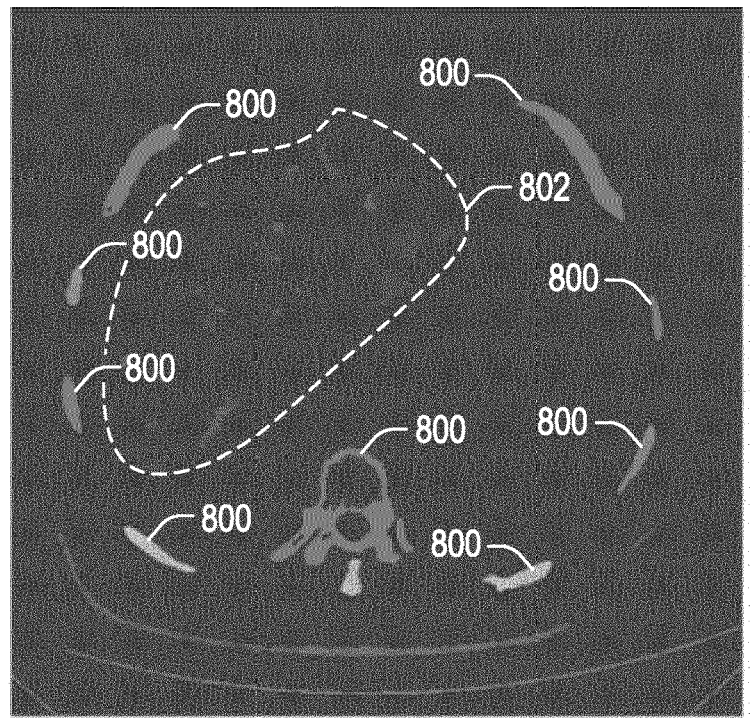
FIG. 8 shows an average density image for the bone component image of FIG. 8.

This average density is shown in FIG. 8. From FIG. 8, it can easily be seen that bone voxels (e.g., in the ribs and spine) belong to regions 802 with relatively higher average density (lighter gray level) compared to residual iodine regions with lower average density (darker gray level) in region 802. The processor 326 identifies and labels regions of residual iodine by a thresholding on the average density image of FIG. 8, e.g., with a threshold value that is below the lowest average bone value and between that value and the average of residual iodine. In one instance, the threshold may be adjustable and adjusted until the residual iodine is identified.

Since the noise in the Compton scatter and photo-electric effect images is strongly anti-correlated, the artifacts in these images also tends to be anti-correlated as well. That is, any deviation in one direction in the Compton scatter images corresponds to a deviation in the opposite direction in the photo-electric effect image, and the processor 326 corrects the images for the residual iodine problem by subtracting a quantity from the Compton scatter image and adding the same quantity to the photo-electric effect image (e.g., in Hounsfield units, attenuation units, etc.) for the identified voxels. In general, this corresponds to moving iodine voxels along a line at 135 degrees in the Compton scatter/photo-electric effect plane in FIG. 5 to move them to the water-iodine line.

Figure 9:
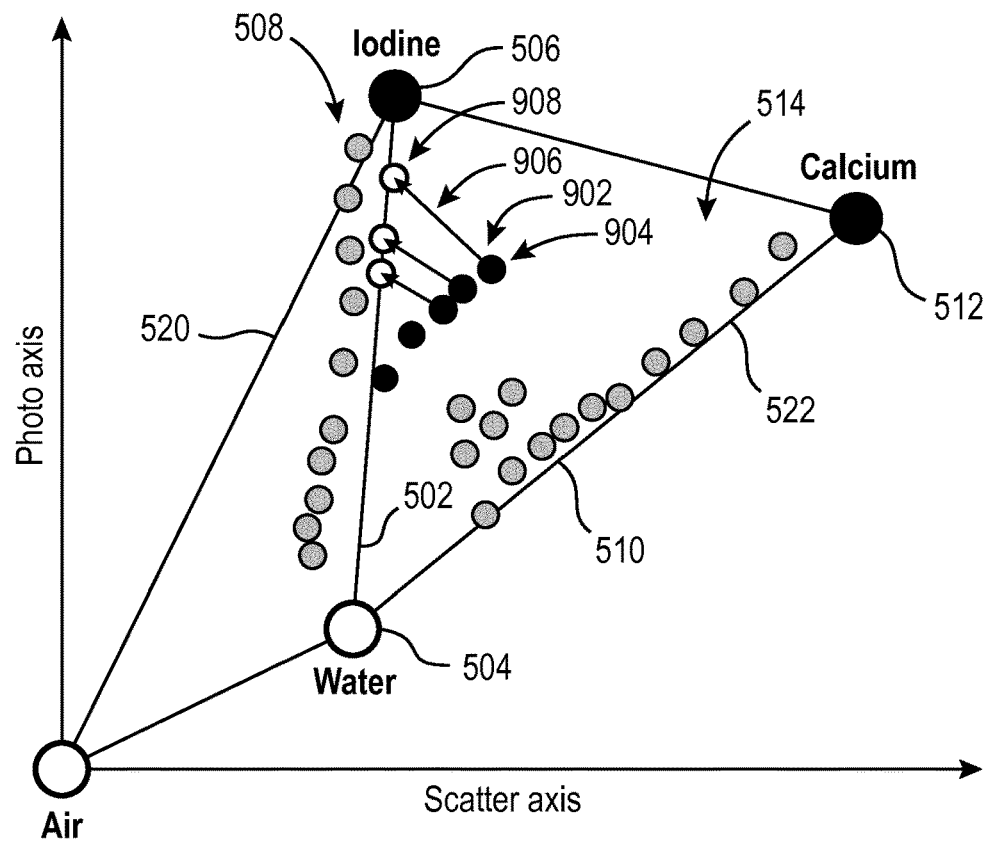
FIG. 9 shows projection of voxels identified as residual iodine along a line until they intersect with a water-iodine line.

By way of non-limiting example, in one instance the processor 326 moves these voxels along the 135-degree line until they lie on the water-iodine line 502 (FIG. 5). This ensures that they will no longer have a bone component in the multi-material decomposition, and thus their contribution to the VNC image will be reduced, yielding a reduction of the residual iodine artifact. An example is shown in FIG. 9, which shows voxels 902 of the voxels 516 from the region 518 (FIG. 5) moved from a first location 904 in the region 518 along 135-degree (relative to the x-y plane) lines 906 to a second location 908, which is on the water-iodine line 502.

Figure 18:
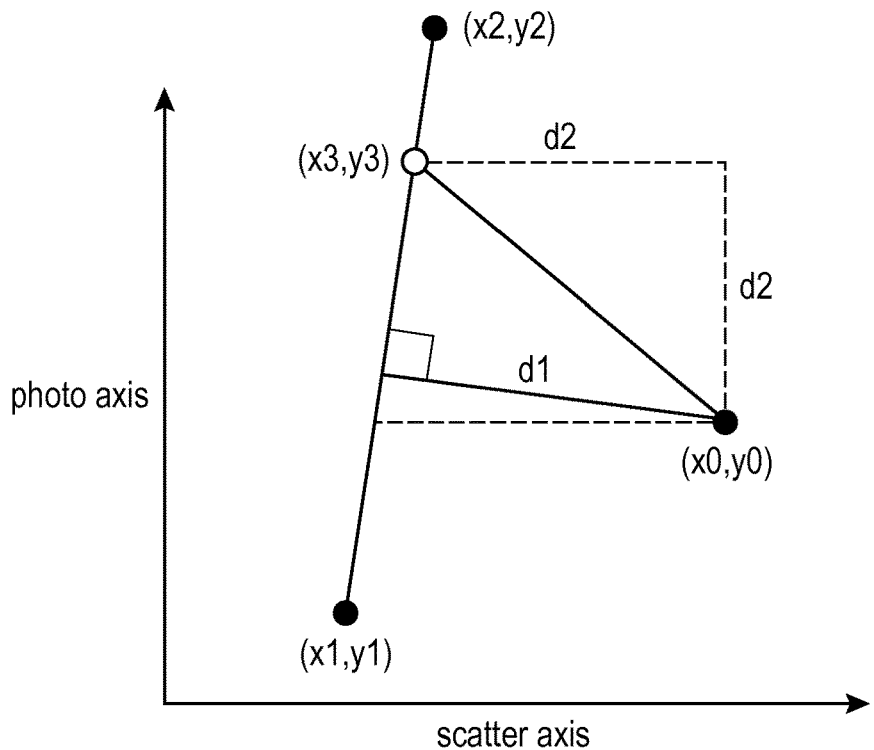
FIG. 18 shows an example of vector subtraction to subtract from a Compton scatter image and add to a photo-electric effect image to move voxels to the water-iodine lines in connection with FIG. 9.

FIG. 18 shows an example of vector subtraction to subtract from the Compton scatter image and add to the photo-electric effect image to move voxels 902 to the water-iodine lines 502. A perpendicular distance d1 from a point (x0,y0) to a line defined by points (x1,y1) and (x2,y2) can be expressed as:

$$d1 = \text{abs}\left(\frac{(y2-y1)*x0 - (x2-x1)*y0 + x2*y1 - y2*x1}{\sqrt{(y2-y1)^2 - (x2-x1)^2}}\right).$$

A value d2 which, when subtracted from the Compton scatter image and added to the photo-electric effect image, will move the original point (x0,y0) onto the line at (x3,y3), can be determined from:

$$d2 = \frac{d1}{\sqrt{2} \cdot \cos(\gamma - \frac{\pi}{4})},$$

where $\gamma$ is an angle of a line, $$\gamma = \text{atan}\left(\frac{y2-y1}{x2-x1}\right).$$

The line denied by (x1,y1) and (x2,y2) may be the same line as the one used to detect the residual iodine, or it may be a different line defined by other criteria.

Figure 10:
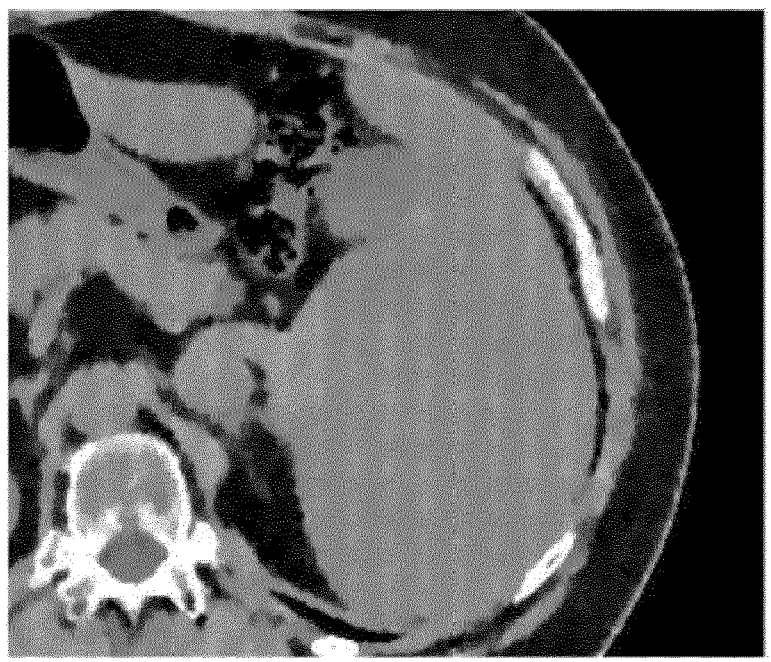
FIG. 10 shows an example of a resulting VNC image without residual iodine artifacts in liver vessels.
Figure 11:
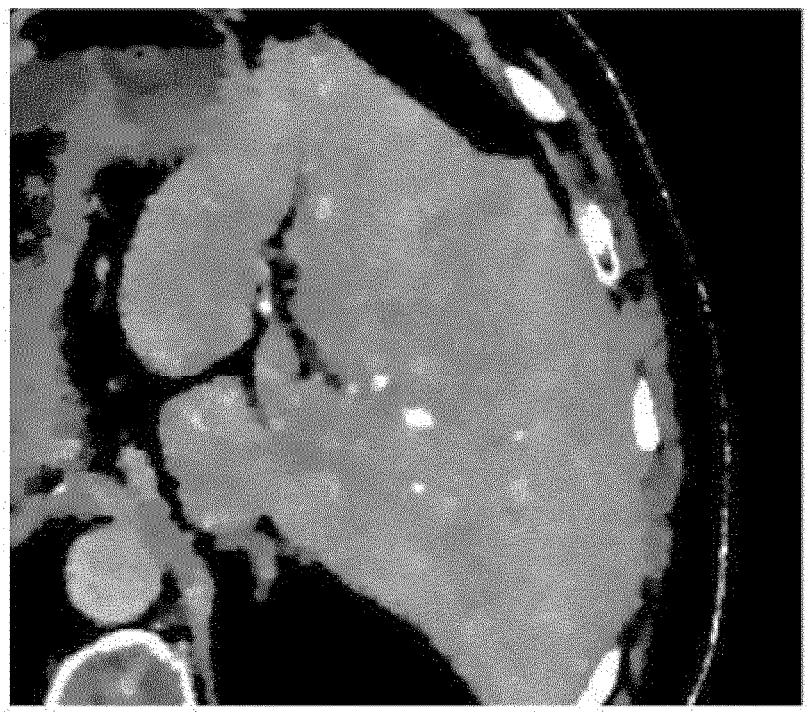
FIG. 11 shows a VNC image with residual iodine artifacts.
Figure 12:
FIG. 12 shows a VNC image without residual iodine artifacts generated using the residual iodine subtraction approached described herein.

After the correction, the VNC image generator 338 creates a VNC image with the corrected Compton scatter and photo-electric effect images. A non-limiting example of is described in application serial number PCT/IB2012/053520, publication number WO2013011418 A2, filed Jul. 10, 2012, and entitled "Spectral ct," the entirety of which is incorporated herein by reference. Other VNC image generation approaches are also contemplated herein. FIG. 10 shows an example a VNC image without residual iodine artifacts in liver vessels. FIGS. 11 and 12 show a side-by-side comparison of a VNC image with residual iodine artifacts (FIG. 11) and a VNC image generate using the residual iodine subtraction approached described herein and without residual iodine artifacts (FIG. 12).

Variations are contemplated next.

In an alternative approach, the identified regions are used as an input to an iterative reconstruction with regularization algorithm to make the regularization directionally dependent to the borders of the identified residual iodine regions to preserve or remove edges to reduce iodine artifact at edges. This variation can be used with the iterative reconstruction descried in application serial number EP 16196707.0, filed Nov. 1, 2016, Ser. No. 16/196,707.0, and entitled "Apparatus for noise reduction in body part imagery," which is incorporated herein by reference in its entirety. This can also be used with other iterative reconstruction algorithms.

EP 16196707.0 describes an approach to reduce certain artifacts in image denoising by a directionally dependent regularization at found edges (which can be found via gradient and/or other approaches) in the images. This can be extended with the approach herein to only a subset of the image edges, e.g., for only residual iodine edges. For this, the processor 326 combines the residual iodine identification with the directional regularization at iodine edges to remove the residual iodine artifacts. Explicitly, the regularization on the Compton scatter image remains the same, but the regularization in the photo-electric effect image is reduced normal to the located edges of residual iodine regions.

Figures 13, 14, 15:
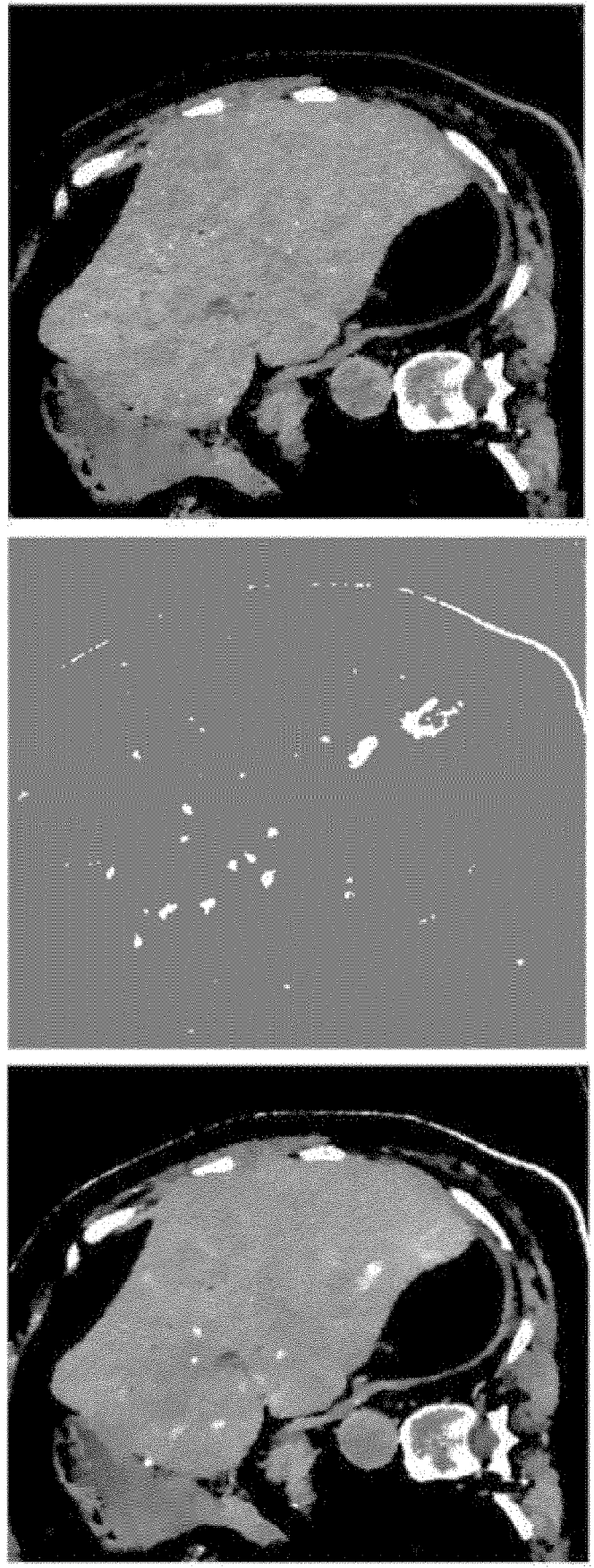
FIG. 13 shows an example of a VNC image generated via a prior art approach and including residual iodine artifacts.
FIG. 14 shows an example residual iodine image.
FIG. 15 shows an example of a VNC image generated via the approached described herein and not including residual iodine artifacts.

FIGS. 13, 14 and 15 shown an example of the combination of residual iodine detection with directional regularization. FIG. 13 shows a VNC image generated from a normal denoising procedure, e.g., as described in EP 16196707.0. From this image, regions of residual iodine are identified by the identifier 402 described herein. FIG. 14 shows a residual iodine image. The processor 326 turns off regularization along the edges of the residual iodine regions to preserve and not smooth the edges in the photo-electric effect image and to remove the edges in the Compton scatter images to correct for residual iodine. FIG. 15 shows a resulting in which the residual iodine artifacts are removed and a VNC image is generated.

Figure 19:
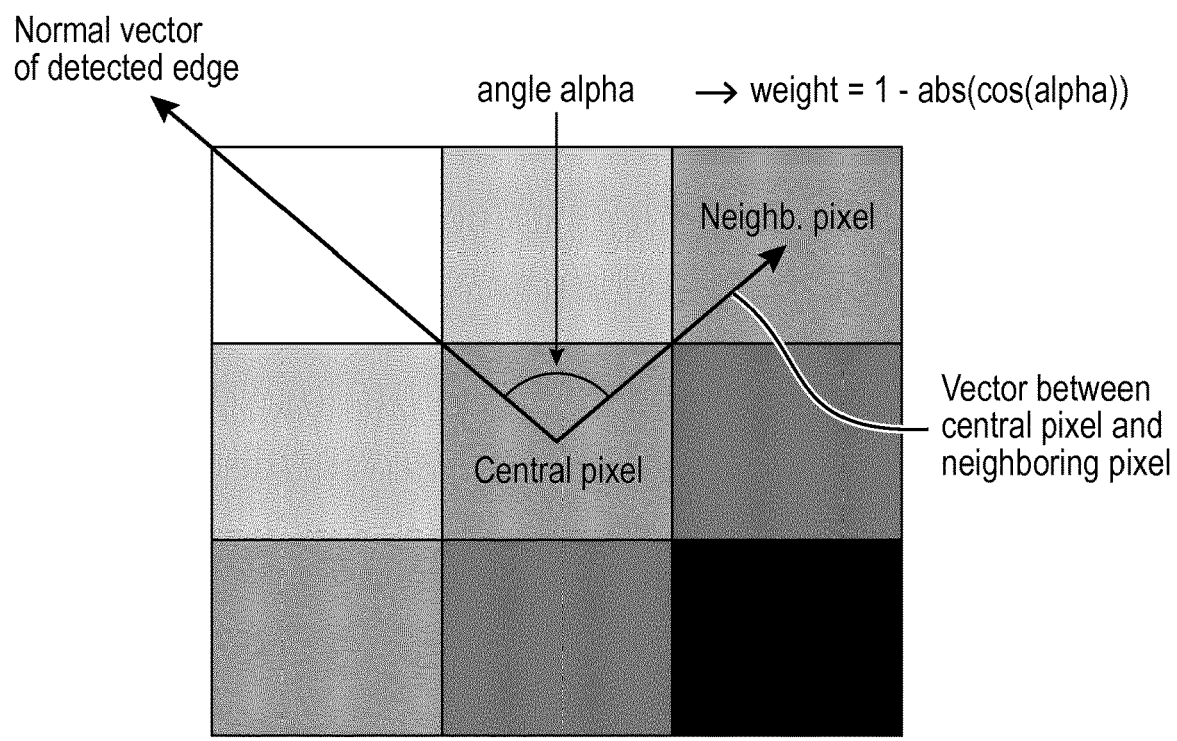
FIG. 19 shows an example of how to control regularization in connection with FIGS. 13-15.

FIG. 19 shows an example of how to control regularization. A common description of a regularization term R is given by:

$$R = \sum_j \sum_{k \in N_j} w_{kj} \Psi(\mu_j - \mu_k)$$

The regularization term runs over all pixels j in the image. For each pixel j, certain neighboring pixels k are chosen. The difference between the values of the neighboring pixels ($\mu_j$-$\mu_k$) is taken, transformed with a potential function $\Psi$ and weighted with the weighting factor $w_{kj}$. This weighting can be done for each neighbor of each pixel individually, allowing to reduce the regularization strength only for certain directions with respect to the "central" pixel j.

In a first step, object edges are calculated, e.g. with a canny edge detector. There are many other approaches for edge detection available which could also be used. The output of the edge detector is used to calculate the regularization weights Wk. This is done by using one minus the absolute value of the cosine of the angle between the normal vector of the detected edge and the vector between the central pixel and the neighboring pixel. Other approaches are contemplated herein.

In a variation of FIG. 3, at least the components of the operator console 318 related to the generating a VNC image (e.g., the VNC image generator 338) are part of a computing system, which is a separate from the imaging system 300. The computing system can receive projection from the imaging system 300, a data repository, another imaging system, and/or other device. An example of suitable data repository is a picture archiving and communication system (PACS), a radiology information system (RIS), a hospital information system (HIS), an electronic medical record (EMR), a database, a server, an imaging system, and/or other data repository.

Figure 16:
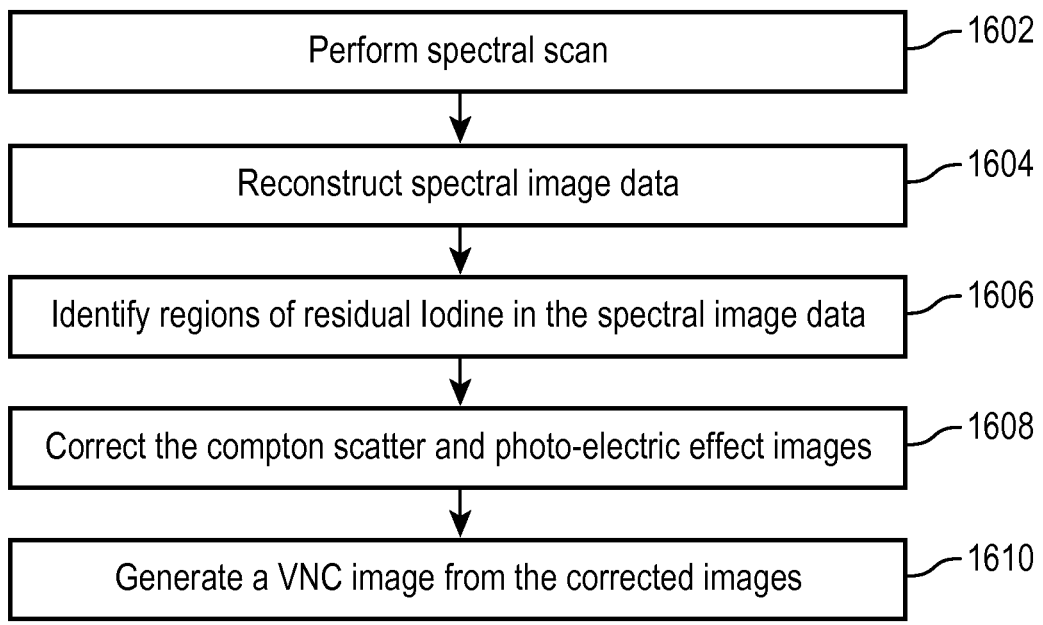
FIG. 16 illustrates an example method for correcting VNC images for residual iodine artifact through adding and subtracting from photo-electric effect and Compton scatter images.

FIG. 16 illustrates an example method for correcting VNC images for residual iodine artifact.

It is to be appreciated that the ordering of the acts in the method is not limiting. As such, other orderings are contemplated herein. In addition, one or more acts may be omitted and/or one or more additional acts may be included.

At 1602, a spectral scan of a subject or object is performed.

At 1604, the resulting projection data is decomposed, reconstructed and de-noise to generate spectral image data, including Compton scatter and photo-electric effect images.

At 1606, regions of residual iodine are located in the Compton scatter and photo-electric effect images, as described herein At 1608, the Compton scatter and photo-electric effect images are corrected for the identified residual iodine, as described herein At 1610, a VNC image is generated from the corrected Compton scatter and photo-electric effect images.

Figure 17:
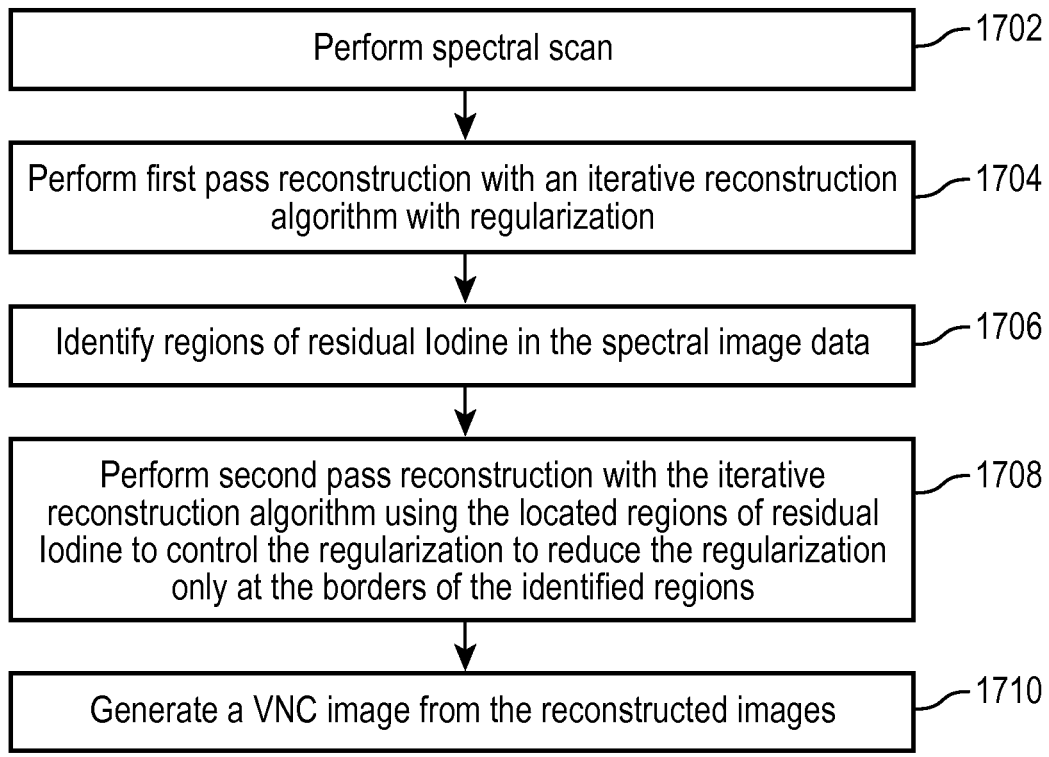
FIG. 17 illustrates an example method for correcting VNC images for residual iodine artifact by controlling regularization at edges of residual iodine voxels during iterative reconstruction with regularization.

FIG. 17 illustrates an example method for correcting VNC images for residual iodine artifact.

It is to be appreciated that the ordering of the acts in the method is not limiting. As such, other orderings are contemplated herein. In addition, one or more acts may be omitted and/or one or more additional acts may be included.

At 1702, a spectral scan of a subject or object is performed.

At 1704, the projection data is reconstructed via a first pass using an iterative reconstruction algorithm with regularization to generate spectral image data, including Compton scatter and photo-electric effect images.

At 1706, regions of residual iodine are located in the Compton scatter and photo-electric effect images.

At 1708, a second reconstruction pass utilizes the located regions of residual iodine with the iterative reconstruction algorithm with regularization to control the regularization to reduce the regularization only at the borders of the identified regions.

At 1710, a VNC image is generated from the reconstructed images.

The acts herein may be implemented by way of computer readable instructions, encoded or embedded on computer readable storage medium, which, when executed by a computer processor(s), cause the processor(s) to carry out the described acts. Additionally, or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A system, comprising:
an input/output interface configured to receive line integrals from a contrast enhanced spectral scan by an imaging system; and
a processor configured to:
decompose the line integrals into at least Compton scatter and photo-electric effect line integrals;
reconstruct the Compton scatter and the photo-electric effect line integrals to generate spectral image data, including at least the Compton scatter and photo-electric effect images;
de-noise the Compton scatter and photo-electric effect images;
identify residual iodine voxels in the de-noised Compton scatter and the photo-electric effect images corresponding to residual iodine artifact; and
produce a virtual non-contrast image using the identified residual iodine voxels.

2. The system of claim 1, wherein the processor is configured to identify the residual iodine voxels by:
generating a bone image from the Compton scatter image and the photo-electric effect image;
computing an average voxel value for voxels in each group of connected voxels;
assigning the average voxel value to all the voxels in a group for each of the groups of connected voxels, thereby creating an average image; and
applying a predetermined threshold to the average image to separate groups with average voxel values corresponding to bone from groups with average voxel values corresponding to iodine.

3. The system of claim 1, wherein the processor is configured to correct the Compton scatter image and the photo-electric effect image based on the identified residual iodine voxels.

4. The system of claim 3, wherein the processor is configured to correct the Compton scatter image and the photo-electric effect image by adding a value to an identified voxel value of the photo-electric effect image and subtracting the value from a corresponding voxel value in the Compton scatter image to correct the Compton scatter image and the photo-electric effect image.

5. The system of claim 3, wherein the processor is configured to correct the Compton scatter image and the photo-electric effect image by moving an identified voxel value from a region between a water-iodine line and a water-calcium line in a photo-electric effect/Compton scatter plot towards the water-iodine line.

6. The system of claim 4, wherein the processor is configured to move the identified voxel value through vector subtraction.

7. The system of claim 3, wherein the processor is configured to produce the virtual non-contrast image with the corrected Compton scatter and photo-electric effect images.

8. The system of claim 1, wherein the processor is further configured to reconstruct the spectral image data during a first reconstruction pass using an iterative reconstruction with regularization, and wherein the processor is configured to perform a second reconstruction pass using the identified residual iodine to control the regularization of the iterative reconstruction.

9. The system of claim 8, wherein the regularization is controlled to preserve edges of the identified residual iodine regions in the photo-electric effect image.

10. The system of claim 8, wherein the regularization is controlled to remove edges of the identified residual iodine regions in the Compton scatter images.

11. A device, comprising:
a processor configured to:
receive a signal indicating residual iodine identified in a Compton scatter image and a photo-electric effect image reconstructed from decomposed line integrals from a contrast enhanced spectral scan by an imaging system and de-noised;
correct the Compton scatter image and the photo-electric effect image based on the identified residual iodine voxels; and
produce a virtual non-contrast image with the corrected Compton scatter and photo-electric effect images.

12. The device of claim 11, wherein the processor is configured to add a value to an identified voxel value of the photo-electric effect image to correct the photo-electric effect image.

13. The device of claim 11, wherein the processor is configured to subtract a value from an identified voxel value of the Compton scatter image to correct the Compton scatter image.

14. The device of claim 11, wherein the processor is configured to move a value of the identified voxel from a region between a water-iodine line and a water-calcium line in a photo-electric effect/Compton scatter plot to the water-iodine line to correct the photo-electric effect image and the Compton scatter image.

15. The device of claim 11, wherein the processor is configured to:
generate a bone image from the Compton scatter image and the photo-electric effect image;
compute an average voxel value for voxels in each group of connected voxels;
assign the average voxel value to all the voxels in a group for each of the groups of connected voxels, thereby creating an average image; and
apply a predetermined threshold to the average image to separate groups with average voxel values corresponding to bone from groups with average voxel values corresponding to iodine to identify the residual iodine.

16. A system, comprising:
a reconstructor configured to reconstruct spectral image data during a first reconstruction pass using an iterative reconstruction with regularization and generate a Compton scatter image and a photo-electric effect image, wherein the spectral image data is decomposed from line integrals generated from a contrast enhanced spectral scan by an imaging system; and
a processor configured to receive a signal indicating residual iodine identified in the Compton scatter image and the photo-electric effect image, wherein the reconstructor performs a second reconstruction pass using the identified residual iodine to control the regularization of the iterative reconstruction.

17. The system of claim 16, wherein the regularization is controlled to preserve edges of the identified residual iodine regions in the photo-electric effect image.

18. The system of claim 16, wherein the regularization is controlled to remove edges of the identified residual iodine regions in the Compton scatter images.

19. The system of claim 16, wherein the processor is configured to:
generate a bone image from the Compton scatter image and the photo-electric effect image;
compute an average voxel value for voxels in each group of connected voxels;
assign the average voxel value to all the voxels in a group for each of the groups of connected voxels, thereby creating an average image; and
apply a predetermined threshold to the average image to separate groups with average voxel values corresponding to bone from groups with average voxel values corresponding to iodine to identify the residual iodine.

20. A method, comprising:
receiving line integrals from a contrast enhanced spectral scan;
decomposing the line integrals into at least Compton scatter and photo-electric effect line integrals;
de-noising the decomposed spectral image data;
reconstructing the de-noise decomposed spectral image data to generate a Compton scatter image and a photo-electric effect image;
identifying residual iodine voxels in the Compton scatter image and the photo-electric effect image corresponding to residual iodine artifact; and
producing a corrected virtual non-contrast image using the identified residual iodine voxels.

21. The method of claim 20, further comprising:
generating a bone image from the Compton scatter image and the photo-electric effect image;
computing an average voxel value for voxels in each group of connected voxels;
assigning the average voxel value to all the voxels in a group for each of the groups of connected voxels, thereby creating an average image; and
applying a predetermined threshold to the average image to separate groups with average voxel values corresponding to bone from groups with average voxel values corresponding to iodine to identify the residual iodine voxels.

22. The method of claim 20, further comprising correcting the Compton scatter image and the photo-electric effect image based on the identified residual iodine voxels.

23. The method of claim 20, further comprising:
reconstructing the spectral image data during a first reconstruction pass using an iterative reconstruction with regularization; and
performing a second reconstruction using the identified residual iodine to control the regularization of the iterative reconstruction.

24. The method of claim 23, further comprising controlling the regularization to preserve edges of the identified residual iodine regions in the photo-electric effect image.

25. The method of claim 23, further comprising controlling the regularization to remove edges of the identified residual iodine regions in the Compton scatter images.

26. The system of claim 1, wherein the processor is configured to identify the residual iodine voxels by distinguishing the residual iodine voxels from bone voxels.

* * * * *